United States Patent [19]

Wright

[11] 4,047,613

[45] Sept. 13, 1977

[54] MEANS AND METHOD FOR INSPECTING IN-PROCESS AEROSOL CONTAINER CLOSURES

[75] Inventor: George W. Wright, Willingboro, N.J.

[73] Assignee: Crown Cork & Seal Company, Inc., Philadelphia, Pa.

[21] Appl. No.: 700,085

[22] Filed: June 28, 1976

[51] Int. Cl.[2] .......... B65G 47/34

[52] U.S. Cl. .......... 209/74 M; 209/75; 209/111.8

[58] Field of Search .......... 209/73, 74, 74 M, 75, 209/81, 111.5, 80

[56] References Cited

U.S. PATENT DOCUMENTS

| | | | |
|---|---|---|---|
| 2,070,339 | 2/1937 | Moore | 209/111.7 |
| 3,346,112 | 10/1967 | Brown et al. | 209/75 |
| 3,462,015 | 8/1969 | Tysver et al. | 209/80 |
| 3,789,983 | 2/1974 | Senesky et al. | 209/111.6 |
| 3,880,750 | 4/1975 | Butler et a. | 209/111.7 R |

*Primary Examiner*—Allen N. Knowles

*Attorney, Agent, or Firm*—Woodcock, Washburn, Kurtz & Mackiewicz

[57] ABSTRACT

An optical and electromagnetic system for checking aerosol container closures for split curls, and for the presence of a continuous bead of sealing compound. The compound is applied to a depression about the periphery of inverted closures, and closures conveyed in single file fashion to an inspection station. A light source disposed in a rotating head above the inspection station scans the periphery of each closure, while a sensor rotating with the source responds to interruptions or voids in the compound. An electromagnetic transducer is rotatably mounted beneath the station and simultaneously scans the curl at the bottom of the inverted closure, producing a defect signal if a split curl is detected. A signal processing system prevents the system from reacting to spurious signals caused by the transit of closures past the inspection station. A counting stage delays the application of a reject signal until the defective closure has passed to an ejection station, at which time an ejection mechanism is triggered and the closure removed from the conveying system.

14 Claims, 7 Drawing Figures

Fig. 1
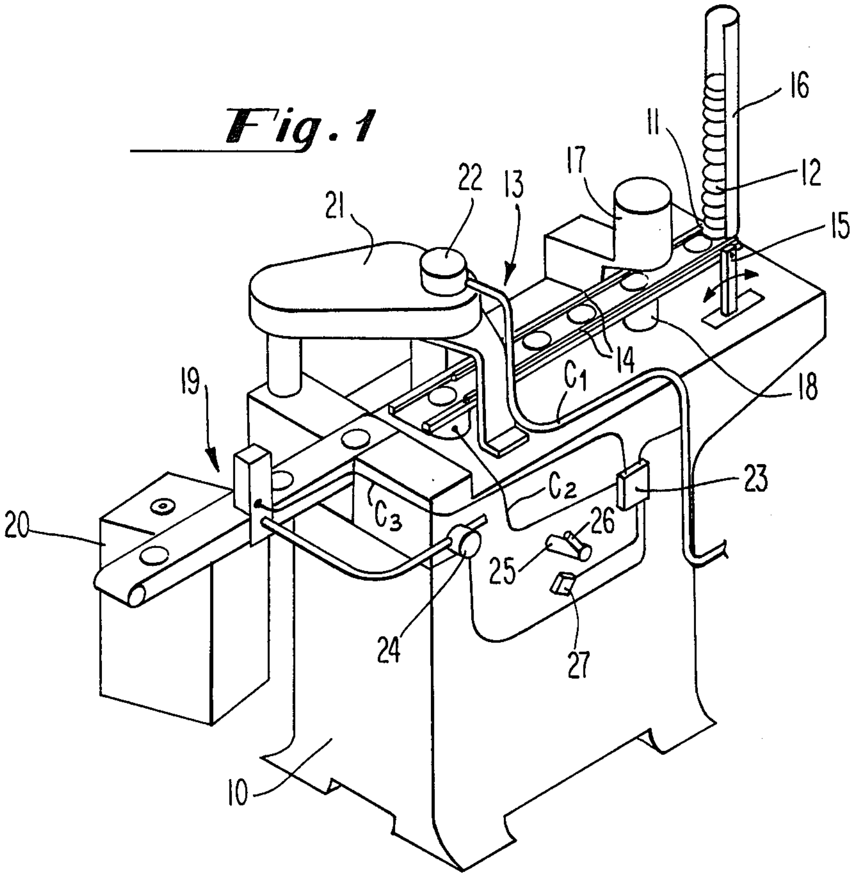
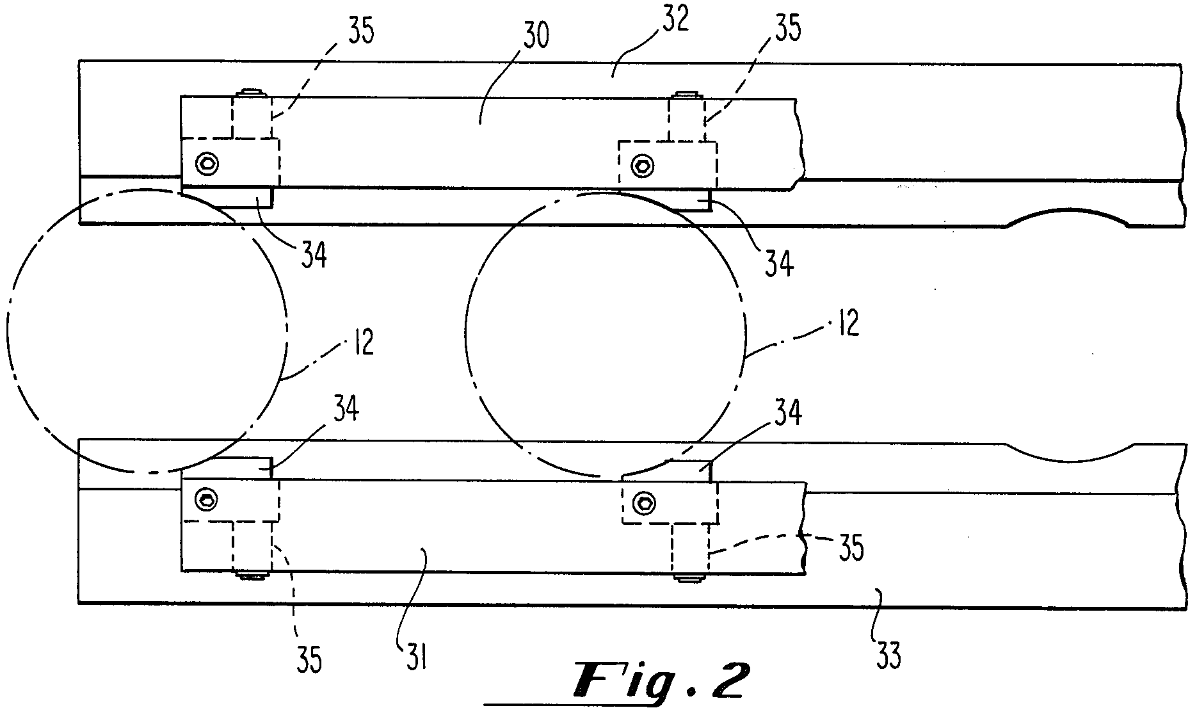
Fig. 2

MEANS AND METHOD FOR INSPECTING IN-PROCESS AEROSOL CONTAINER CLOSURES

BACKGROUND OF THE INVENTION

The present invention relates to inspection systems, and more particularly to mechanisms for inspecting in-process container closures.

In the production and processing of metallic closures for containers it is desirable to identify and eliminate defective closures before they are permanently affixed to containers. In view of the mass production techniques which are required to produce closures and containers economically, inspection of closure members has commonly been foregone in some respects. The difficulty in devising systems to rapidly and accurately check individual closures has caused container manufacturers to implement processes in which the containers were not fully checked until they had been filled and pressurized. While this makes inspection considerably easier, it obviously entails substantial expense and waste. Nonetheless, until now it has been considered more practical than attempting to inspect each individual closure member while in process. Aerosol container closures are commonly crimped over the open mouth of an open-ended cylindrical can. In order to assure a pressure-tight joint it is conventional to apply a bead of sealing compound about the periphery of the closure, before it is assembled to the container body. Checking for the continuity of the sealing bead has presented formidable problems, owing in part to the number and speed with which container closures are produced and conveyed during the manufacturing and assembly process. Still another chronic problem with state-of-the-art aerosol closures is the cracking or splitting of a curled flange at the uppermost edge of the closure. Such cracks or splits are often very hard to recognize, even by visual inspection. Again, the inspection problems are increased substantially due to the number and rate of production of closures. Finally, the cost of floor space in a container manufacturing plant is such as to discourage the use of large and elaborate testing facilities, particularly wherein such facilities must include multiple paths to allow for automatically inspecting closures at a rate less than that at which they are being produced. Accordingly, it will be appreciated that it would be desirable to provide a compact apparatus which will quickly and economically inspect succesive in-process metallic closures.

It is therefore an object of the present invention to provide means for determining the integrity of sealing compound applied to metallic container closures.

Another object is to provide means for detecting split curls in metallic closures.

Yet another object is to provide improved apparatus for detecting defects in in-process metallic closures and discharging the closures in timed relationship with their advance along a predetermined path.

Still another object is to provide a method for inspecting metallic closures for the presence of sealing compound.

Yet another object of the invention is to provide a method for simultaneously inspecting metallic closures for the absence of sealing compound, and for split curls.

SUMMARY OF THE INVENTION

Briefly stated, in accordance with one aspect of the invention, the foregoing objects are achieved by providing a path for conveyed closures which includes an inspection station. A rotating head is disposed above the station and carries a source of collimated light, and a light-responsive sensor. Light is directed toward the compound-bearing periphery of a closure at the inspection station. Perturbations in the reflected light are taken to be indicative of gaps in the compound, and a defect signal is produced. In response to the defect signal a delay stage produces a reject signal, after the expiration of a period during which the faulty closure reaches an ejection station. The reject signal then actuates the ejection station to discharge the closure.

In a preferred embodiment an electromagnetic transducer is rotatably disposed beneath the inspection station, and operates to induce a magnetic field across an inner, concentric curl of the closure. Sensed discontinuities in the field are taken to be representative of splits in the curl and applied to the delay stage to cause the eventual discharge of the closure. Signal processing means are provided and define time periods during which the ejection apparatus responds to defect signals.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

FIG. 1 is a perspective illustration of apparatus embodying the present invention;

FIG. 2 illustrates a portion of a conveying mechanism for use with the system of FIG. 1;

DESCRIPTION OF A PREFERRED EMBODIMENT

Figure 3:
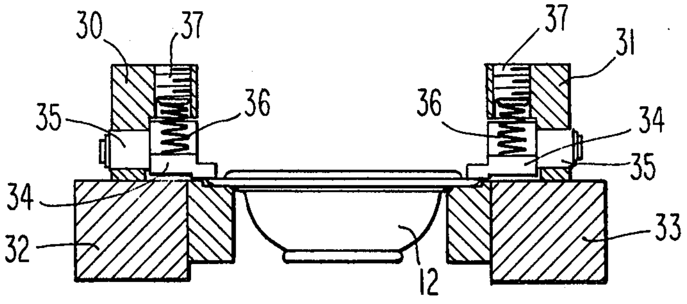
FIG. 3 is a end view of the mechanism of FIG. 2.

In FIG. 1 there is shown in perspective a machine assembly 10 adapted for practicing the present invention. A conveyor generally indicated at 11 transports a plurality of metallic closures 12 in in-line fashion to an inspection station 13. Feed bars 14, to be explained in further detail hereinafter, are positioned astride the path of the closures and periodically reciprocated by lever 15 to urge them along the path. A vertical magazine 16 contains a stack of closures which drop between the feed bars 14 each time the bars are reciprocated. As the bars reciprocate they advance the closures in step-by-step fashion, and at fixed intervals, along the conveyor path. Various stopping points along the path of the closures, termed stations, comprise sites at which they are operated upon. At a first station a compound applicator head 17 applies a sealing compound, which may for instance be plastisol, to the periphery of each closure. As each successive closure is advanced by a stroke of the feed bars 14 it is engaged from beneath by a rotating chuck 18. Compound is then applied at some point about the periphery of the closure, eventually covering the periphery as the closure is rotated.

Another reciprocation of the feed bars brings the closure to the inspection station 13, to be more fully described hereinafter. After the closures traverse the inspection station they are transported to an ejection station generally indicated at 19 wherein closures which have been identified as defective are ejected into an appropriate container 20.

An upper, rotating inspection head (not shown) is rotated by a drive system housed in main and upper enclosures 21 and 22, respectively. Signals from an upper transducer are carried by cable $C_1$ to a signal processing stage 23. Signals from a rotating transducer located beneath the path of the closures are carried to stage 23 by another cable $C_2$. Still another input, from a proximity detector at inspection station 19, is carried to the signal processing stage by cable $C_3$. Stage 23 outputs an eject signal to a valve 24 at appropriate times during the inspection and conveying process. Valve 24 applies a blast of compressed air from a plant air supply (not shown) for ejecting defective closures.

In order that the ejection mechanism operates at the correct time to thereby eject a closure which was earlier found to be faulty, a timing mechanism is provided. A shaft 25 operated by the internal drive system of the mechanism, turns at some rate which is synchronous with the advance of each closure. The shaft is advantageously provided with a lateral extension or flag 26 which passes by a sensor housed in delay unit 27. By sensing the number of times element 26 passes the sensor, and therefore the number of rotations of shaft 25, the advance of the closures can be calculated so that after a predetermined number of revolutions a closure formerly disposed at inspection station 13 will be known to have reached ejection station 19.

Turning now to FIG. 2, there is shown a plan view of a feed bar assembly advantageously used to advance the metallic closures. The feed bars 30 and 31 are slidingly disposed upon guide rails 32 and 33, respectively. The guide rails are formed with tracks for keeping closures 12 upon a desired path. The feed bars are fitted with pairs of opposed latches 34 each of which rotates in a vertical plane upon an axle 35. As the feed bars are urged leftwardly by an appropriate mechanism, such as a crank and lever drive, latches 34 engage the rightward sides of closures 12 and urge them to the left.

At the end of their stroke, the feed bars are returned to the right. As the latches encounter the peripheries of closures lying behind them, they pivot upon their axes and ride up over the edges of the closures. After they pass over the closures the latches spring downwardly into place and are ready to urge the closures leftwardly upon the next advance of the feed bars.

FIG. 3 illustrates the construction of the feed bar latch assembly in further detail. As stated, the latches pivot upon axle members 35 which are journaled in feed bars 30, 31. A coil spring 36 bears upon an upper surface of each latch, the spring being retained by a threaded plug 37. In the position shown in FIG. 3 feed bars 30, 31 have commenced their retreat and latches 34 have been cammed upwardly against the force of springs 36 so that they ride across the top of the outer periphery of closure 12. After retreating past the edge of the closure, latches 34 will move back to their lower position so that upon the next succeeding advance of feed bars 30, 31 the latches will force the closure ahead.

Figure 4:
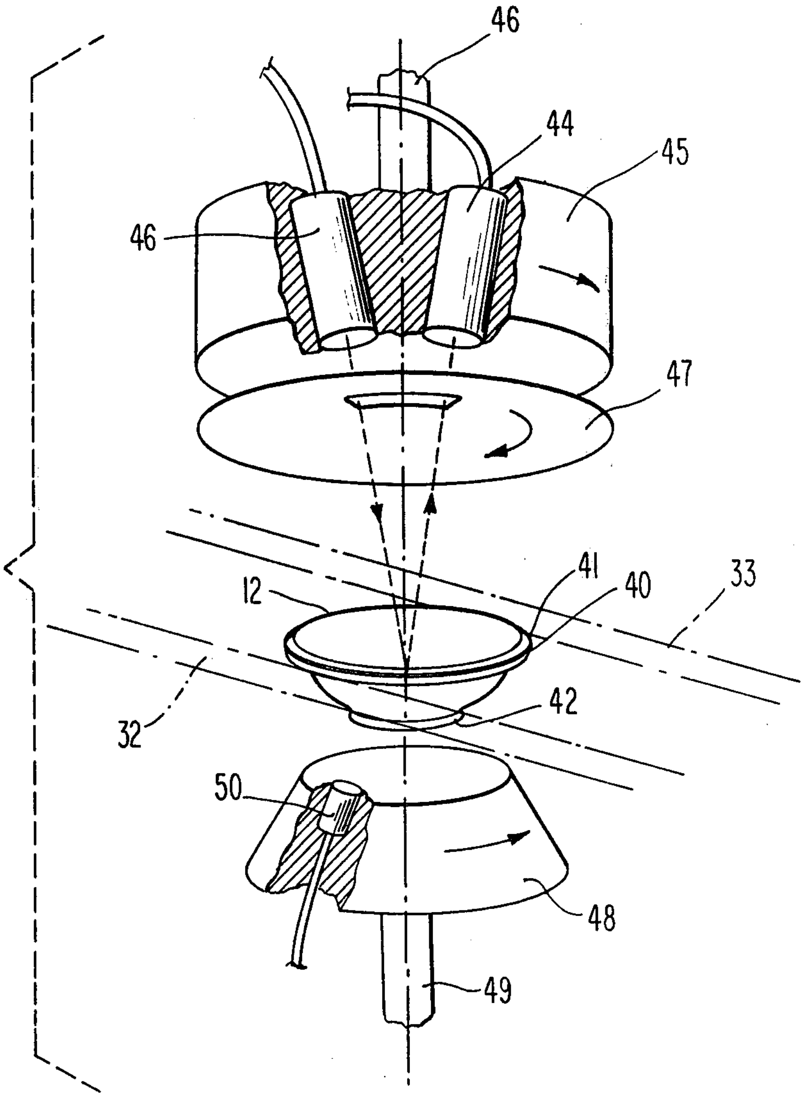
FIG. 4 is an idealized drawing illustrating principles of the present invention.

FIG. 4 illustrates in idealized form the apparatus which is present at inspection station 13, and used to inspect each of the closures 12 for specific faults. Metallic closure 12 comprises a generally cup-shaped element having outer, peripheral flange 40. Disposed within the flange is a quantity of sealing compound 41. As is familiar to those skilled in the art, when closure 12 is placed upon a container, such as a can, and flange 40 is crimped about the mouth of the can, the sealing compound serves to fill any voids and prevents the escape of material from within the can. While a number of sealants are commercially available, typically they take the form of a plastisol which will not react with the product to be packed within the completed container.

At the lowermost extremity of the inverted closure is a smaller or inner flange 42. Flange 42 has a generally circular cross-section and is formed by curling metal about the mouth of an opening in the closure backward. This flange is denominated a curl due to its appearance, and the manner of its manufacture.

It will be readily understood that a discontinuity in sealing compound 41 will in all likelihood give rise to a leak in the completed container particularly where, as here, the container is an aerosol can within which pressurized propellant is to be retained. In prior art approaches it has normally been assumed that sealing compound 41 is evenly disposed within the outer flange 40. Typically, completed closures are assembled to can bodies and the can filled, so that leaks which arise due to improper distribution of sealing compound are not evident until the cans are filled with a product and pressurized. Despite the obvious expense and waste which is entailed in scrapping already-filled containers it has traditionally been believed that this is a necessary manufacturing loss due to the inability of machine manufacturers to produce efficient inspection apparatus which would operate at a sufficiently high rate.

Due to the inordinate distortion and stretching of the metal which is required to form curl 42, cracks or splits in the curled metal occur frequently. However, as has been the case with closures having improperly-distributed sealing compound, no practical means have been devised for inspecting curls for splits at an acceptably rapid rate.

In order to rapidly and efficiently check the distribution of sealing compound in the outer flange of the closure, a light source 43 is disposed above the closure. Closely associated with source 43 is a photosensor unit 44. The light source and sensor are disposed within a first, rotary inspection head 45 which is mounted upon a shaft 46 driven by appropriate means (not shown). In a preferred embodiment a mask 47 is associated with the rotary head 45 and rotates therewith serving to at least partially collimate a light beam emanating from source 43, and to isolate a segment of the periphery of closure 12.

In the foregoing manner sensor 44 is caused to receive light emanating from source 43, and reflected by the compound-carrying depression extending about the periphery of the closure. Inasmuch as the sealing compound exhibits considerably less reflectivity than does the metal of the closure, areas which are filled with compound will allow relatively little light to be reflected to sensor 44. However, should there be a discontinuity or gap in the sealing compound an area of high reflectance will result, so that the sensor will be caused to output a signal indicative of an absence of compound.

In order that the entire periphery of the closure may be inspected, light source 43 and sensor 44 are rotated in inspection head 45 so that they sequentially scan about the entire peripheral depression of the closure. It is contemplated that head 45 will be rotated continuously while closures 12 are sequentially positioned at the inspection station along guides 32, 33. Closure which are identified as having a defective filling of compound are discharged further downstream in the product flow as a consequence of signals outputted by sensor 44.

In order to completely inspect the closures at a single inspection station, and to provide a more compact and efficient inspection mechanism a second inspection head 48 is disposed beneath the inspection station, advantageously coaxial with upper head 45. Lower head 48 is mounted upon shaft 49 which is rotated by appropriate drive means (not shown). Head 48 carries an electromagnetic transducer 50 which is of a type which will be sensitive to discontinuities or splits in the curl 42 of the metal closure. As discussed above in forming the innermost flange, herein designated curl 42, the metal about the inner periphery of a closure blank is rolled outwardly so as to form a generally tubular flange. The substantial deformation of the metal which is thus effected occasionally causes the curl to split in a generally radial direction. Often these splits are practically undetectable by visual methods, their presence only becoming apparent after a container is assembled, filled and and pressurized.

Transducer 50, while it may be of any one of several types, is preferably of the type which induces an electromagnetic field about a narrow area, here curl 42. Of course, the continuity of the magnetic field in a metallic body is dependent upon continuity of the body itself. Accordingly, a split in curl 42 comprises an area of greatly increased magnetic reluctance. This will be true even though the split is of extremely small width, as long as the continuity of the metal itself has been broken. Transducer 50 operates to sense such a change in field continuity, and outputs a signal which may be interpreted as indicating a split in the curl of a closure.

In order that the curl may be closely inspected, one region at a time, it is necessary to displace the closure with respect to the scanning transducer. With the present invention, this is accomplished by mounting transducer 50 upon rotating inspection head 48 such that the transducer describes a circle, scanning about the entire periphery of curl 42. By rotating head 48 at a sufficient speed a number of repeated scans may be accomplished in the short period during which closure 12 is disposed in the inspection station. Should a closure be identified as defective, the signal produced by transducer 50 is used to operate an ejection mechanism disposed downstream of the product flow, and timed to eject the appropriate one of the passing closures.

Figure 5:
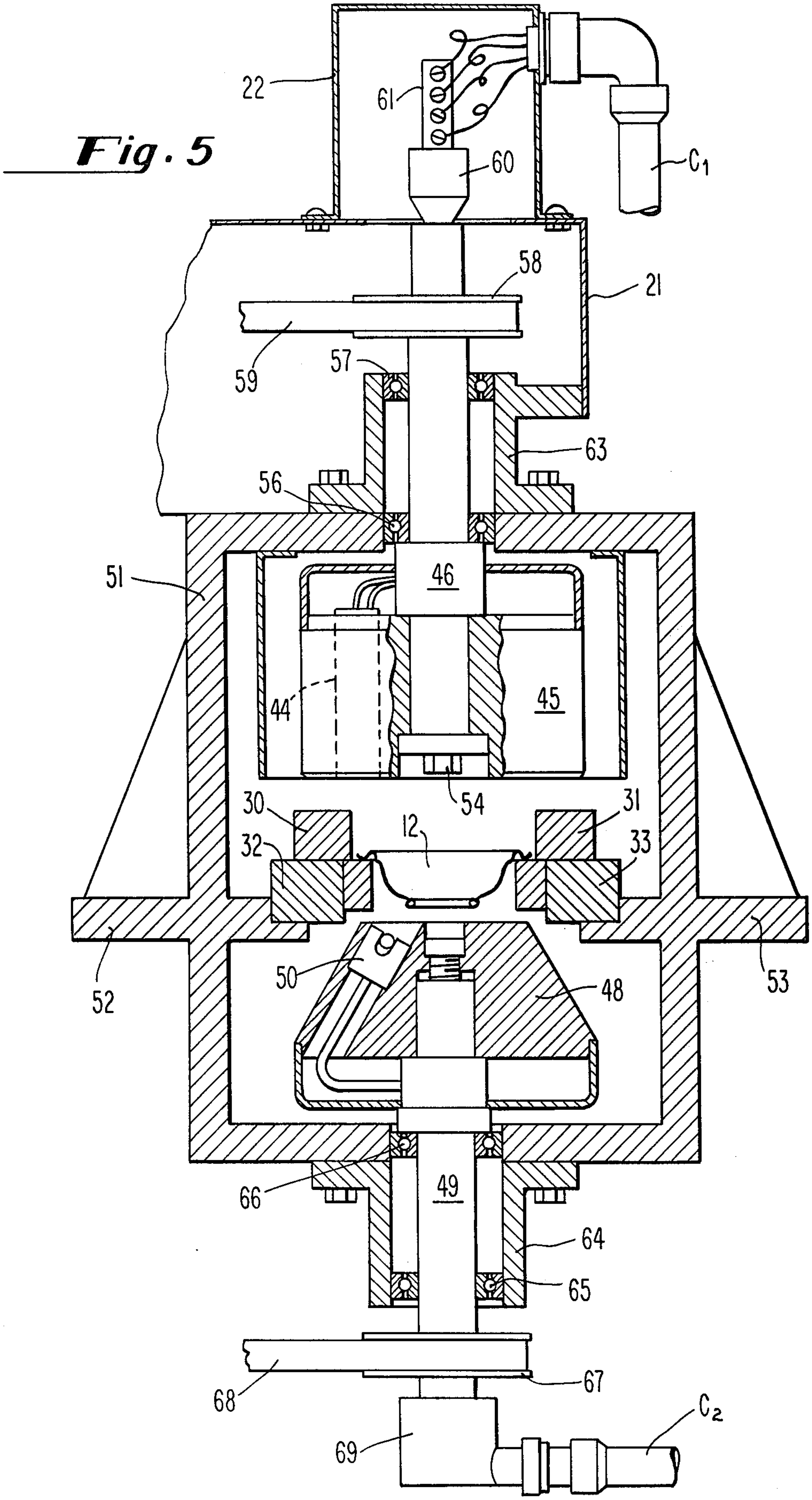
FIG. 5 is a cutaway view of apparatus for practicing the present invention.

FIG. 5 represents a cross-sectional view of a preferred form of the inventive apparatus. Guides 32 and 33 extend through a housing 51, which may be fabricated from steel plate or the like. The housing is conveniently provided with flanges 52, 53 so it may be mounted upon a machine frame. Feed bars 30, 31 extend along the upper surfaces of guides 32 and 33, respectively, and carry latches (not shown) for sequentially urging closures 12 along the guides. Upper and lower inspection heads 45 and 48, respectively, are disposed coaxially with a closure 12 at the inspection station, so that simultaneous inspection for split curls and missing compound may be effected.

Upper head 45 is mounted upon a shaft 46 by means of a bolt 54 and washer 55. Shaft 46 is provided with appropriate shoulders for capturing head 45 thereon, and for seating against bearings 56, 57 in which the shaft rotates. A pulley is affixed to the upper end of the shaft, and driven by means of belt 59 to effect rotation of head 45. At the uppermost end of shaft 46 is a commercially available mercury-filled slip ring assembly 60. By means of such an assembly, or equivalently by means of slip rings or the like, electrical signals are transferred from terminal board 61 to the light source and sensor carried in head 45. Cables from the source and sensor may conveniently be placed within an axial bore in shaft 46, extending upwardly and connecting with slip rings or the like in assembly 60. Power for the light source, and signals from the sensor, are then transferred from the drive area by way of cable $C_1$ to other signal processing stages. Housing 21 and 22, which are formed of sheet metal, enclose the rotating members and serve as protection for electrical connections. Surmounting housing 51 is a bearing carrier 63 which supports bearing 57, and serves as a reservoir for lubricant for bearings 56 and 57.

At the lower end of housing 51 is a carrier 64. Carrier 64 may advantageously be coupled to housing 51 by means of bolts or the like and serves both as a carrier for lowermost bearing 65, and as a reservoir for lubricant for bearing 65 and for upper bearing 66. Bearings 65 and 66 rotatably support shaft 49, upon which the lower inspection head is disposed. Beneath housing 64 a pulley 67 is affixed to the shaft and is driven by a belt 68 in the same manner as upper shaft 46. Belts 59, 68 may be coupled to a common shaft or drive system so that both inspection heads are rotated by a common source of power.

At the lowermost end of shaft 49 is a second mercury-filled slip ring assembly 69. As discussed hereinabove, such a connector serves to provide electrical continuity between a stationary conductor and a rotating one. As was the case with the light source and sensor disposed in upper inspection head 45, power for the electromagnetic transducer 50 and signals therefrom may conveniently be coupled from contact 69 to transducer 50 by means of a cable disposed in an axial bore within power shaft 49. Leads supplying power to, and receiving signals from, transducer 50 extend from contact 69 through a cable $C_2$ to a distant power source.

As set forth above, as the upper inspection head 45 rotates the juxtaposed light source and sensor scan about the periphery of closure 12, light reflected therefrom being received by the sensor and producing an appropriate signal. In a preferred embodiment the light source comprises a light emitting diode (LED) of a sort which produces infrared light. In this connection it should be noted that while the term "light" is used it need not be necessary that the light source produce visible light. In fact, any radiation which exhibits different reflectance characteristics upon metal, as compared to sealing compound, will serve. If white light is used, however, shielding should be provided to prevent reflections from incident ambient lighting from being detected by the sensor and causing spurious signals. It is for the latter reason that infrared light is used in a preferred embodiment.

Various sorts of optical sender-receiver units may be adapted for use in the present invention. In one successfully tested embodiment a power source and signal receiving unit manufactured by Opcon, Inc., of Everett, Wash. was used. The light source selected was Opcon, Inc. Model 1160A-300 and the detector, also provided by Opcon, Inc., was No. 1261A-300. Further, while the apparatus comprising the signal sensing unit which accepts a defect signal was also obtained from Opcon, Inc., it should be recognized that equivalent sensing and signal processing units may readily be assembled from commercially-available components and the present invention is in no way limited to the specific elements mentioned above.

In the successfully tested embodiment the electromagnetic transducer 50 and signal processing elements were obtained from Hentschel Instruments, Inc. of Ann Arbor, Mich. With the system depicted a magnet is disposed in close conjunction with the path of the closure curl. As the magnet moves relative to the curl the flux thereof traverses the metal of the curl. A pickup or sensor unit, comprised of a coil whose turns are so disposed as to be intercepted by the field of the magnet, is provided. A detector is coupled to the coil and outputs a signal in response to an out-of-tolerance variation in the magnetic field. Such a detector may readily be assembled from commercially available components by persons skilled in the art it only being necessary to detect the above-tolerance field fluctuations, which occur at some multiple of the rotational speed of the lower inspection head. Such signals, or the amplified analogs thereof, comprise defect signals which are used to energize an eject mechanism downstream in the container flow, as shown in FIG. 1.

Figure 6:
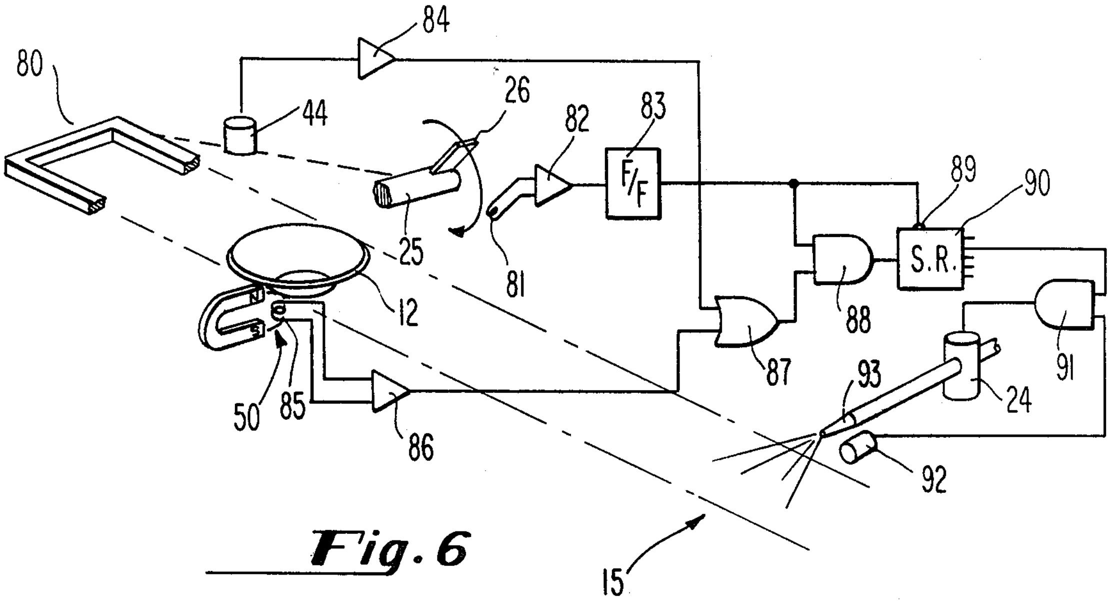
FIG. 6 is a schematic diagram of a signal processing system used in the invention.

FIG. 6 shows in schematic form a cntrol and signal processing system useful with the mechanism of FIG. 5. As discussed above, metallic closures 12 are sequentially advanced by appropriate mechanism, herein denominated at 80. The latter mechanism is operated by a drive (not shown) which also rotates shaft 25, with a magnetic flag 26 attached thereto. Accordingly, the rotation of flag 26 will occur in synchronism with advancement of the closures. By adjusting the angular position of the flag upon shaft 25 the relative timing of the passage of flag 26 past any stationary point with respect to the movement of the closures can be adjusted. A magnetic pickup 81 is disposed adjacent the path of flag 26 and produces a pulse or spike each time the flag passes. The spike is amplified by an appropriate detector or amplifier 82 and passed to a pulse width control flip-flop 83. As is well known by those skilled in the art, such a flip-flop outputs a regular, relatively rectangular electrical pulse of a predetermined duration for each triggering pulse applied thereto. For reasons to be explained hereinafter the duration of the pulses outputted by flip-flop 83 is less than the residence time of a closure at the inspection station. The pickup and associated circuitry comprise a gating means which allows faulty closures to be accurately identified.

Pulses outputted by sensor 44 are processed by an amplifier 84 to produce a defect signal. Similarly, pulses arising in pickup coil 85 of electromagnetic transducer 50 are applied to a detector or amplifier 86 for producing another defect signal. The defect signals are communicated to OR gate 87, the output of which is coupled to one input of an AND gate 88. Signals outputed by AND gate 88 are applied to the input terminal of a shift register 90 as shown.

The other input of AND gate 88 is coupled to pulse width control flip-flop 83. The flip-flop is also connected to the shift terminal 89 of shift register 90 which serves as a delay stage. Reject signals outputted by the shift register are applied to one input of AND gate 91, the other input of which is coupled to a proximity detector 92. While the term "proximity detector" is used herein, it will readily be understood that any appropriate transducer may be used which outputs an electrical signal in response to the presence of a metallic closure at eject station 15. For ferromagnetic closures a reed switch serves admirably to produce the necessary signal.

Finally, the signal outputted by AND gate 91 is coupled to a solenoid valve 24 which gates air from a compressed air reservoir (not shown) to a nozzle 93 for discharging closures from the ejection station.

Figure 7:
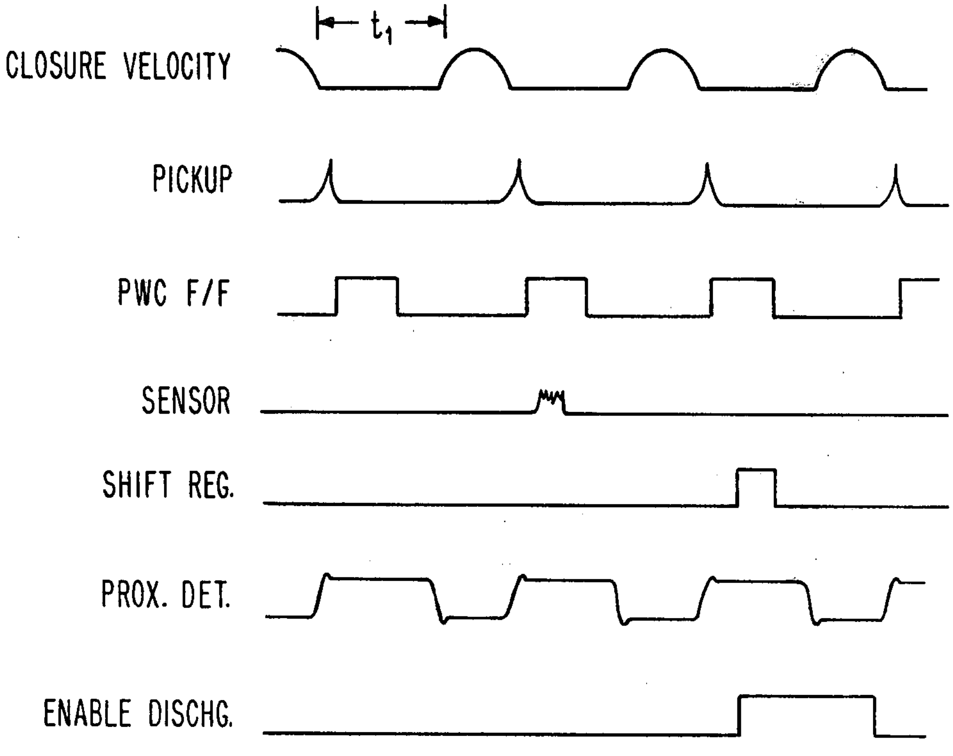
FIG. 7 is a timing diagram showing waveforms arising in the system of FIG. 6.

The operation of the system of FIG. 6 will now be described, making reference both to the enumerated elements of the latter Figure, and to the waveform diagram of FIG. 7 which characterizes their operation. As stated hereinabove, closures are sequentially advanced, the dwell time between each advancement comprising a residence time during which the closures reside at a predetermined position. The positions are advantageously spaced apart so that different operations may be simultaneously conducted at adjacent residence positions. For instance, during one dwell time a first closure may reside at the inspection station and undergo inspection while a second, succeeding closure resides at a previous station wherein sealing compound is applied thereto. Accordingly, the velocity of each closure is approximated by the CLOSURE VELOCITY waveform of FIG. 7. As depicted, each closure accelerates to some velocity, then decelerates and comes to a halt for some period $t_1$. It is during this latter period that inspection, rejection, compound application, etc. may be accomplished.

In order to synchronize operation of the system with movement of the closures, a signal is provided which arises in synchronism with the closure movement. In this connection, shaft 25 and magnetic flag 26 rotate in synchronism with operation of advancement mechanism 80. In the present system, the magnetic flag rotates once for each operation of the advancement mechanism. It will be recognized, however, that the one-to-one ratio described is not critical to the practice of the invention, as any synchronously-arising signal may be used.

The angular position of flag 26 upon shaft 25 is adjusted so that the PICKUP signal derived by transducer 81 arises at approximately the beginning of residence period $t_1$. In response to the production of a voltage spike by transducer 81, which is amplified by amplifier 82, pulse width control flip-flop 83 outputs a series of regular rectangular pulses as depicted by the curve labeled PWC F/F. These pulses advantageously arise over a period which is substantially shorter than period $t_1$ and occur within the latter period. As is easily recognized, the pulses applied from flip-flop 83 to AND gate 88 do not of themselves cause the AND gate to output any signals, due to the logical prerequisites inherent in an AND gate. However, when either sensor 44 or electromagnetic transducer 50 give rise to a defect signal, such signal is passed by OR gate 87 to the remaining input of AND gate 88. Spurious signals produced by the sensors during the transit time of the closures do not cause AND gate 88 to output a signal, owing to the fact that no signal is being outputted by flip-flop 83 during the transit time. Accordingly, a coincidence of defect and a flip-flop signal can enable AND gate 88, and such a coincidence can only occur during the residence periods $t_1$.

Should a fault be detected in a closure during the production of a signal by flip-flop 83 and thus during a period of residence of a closure at the inspection station, the coincidence of these signals at AND gate 88 causes the AND gate to output a pulse to a shift register 90. The pulse is accepted and stored in the shift register, according to normal shift register operation. At the same time, the output of flip-flop 83 is applied to the gating terminal 89 of the shift register. Inasmuch as the incoming pulse does not precede the signal at the shift gate of the register, however, the stored pulse is maintained in a first position. When the flip-flop 83 produces its next pulse, however, the application of the latter pulse to shift gate terminal 89 causes the pulse within register 90 to be shifted to its next position.

As is familiar to those skilled in the art, a shift register conventionally is provided with a plurality of such positions, at least some of which are associated with output terminals. In the described embodiment the second output terminal of shift register 90, which corresponds to the second position within the register, is coupled to AND gate 91. In this manner the first pulse produced by flip-flop 83 after a defect signal is received by a shift register, operates to cause the previously-received defect pulse to energize the second output terminal of the shift register and accordingly to cause a reject pulse to appear at one input of AND gate 91.

If the transport of the closures is absolutely regular and predictable, solenoid 24 can be energized immediately by the output of the shift register. However, the inventor has found that in practice the closures are not always transported at regular intervals. Accordingly, a proximity detector 92 is placed adjacent the path of the closures at ejection station 15. The proximity detector applies an enabling signal to the other input of AND gate 91 when a conveyed closure is sensed in the proper position to be ejected from its path by compressed air from nozzle 93. In other words it is not until the coincidence of a defect signal from shift register 90, and a presence-indicating signal from transducer 92, occur simultaneously that the ejection mechanism is operated. As depicted by the ENABLE DISCHG. signal of FIG. 7 the time constant of the valve assembly must be such that an adequately long blast of air be delivered for ejecting the defective closure, but terminating before a succeeding closure is conveyed to the ejection station.

As will be evident from the foregoing description certain aspects of the invention are not limited to the particular details of the examples illustrated, and it is therefore contemplated that other modifications or applications will occur to those skilled in the art. It is accordingly intended that the appended claims shall cover all such modifications or applications as do not depart from the true spirit and scope of the invention.

What is claimed as new and desired to be secured by Letters Patent of the United States is:

1. Apparatus for inspecting top closures for aerosol containers, said closures having an outer, peripheral depressed flange for receiving a quantity of sealing compound and an inner, curled flange, comprising:

conveying means for guiding closures in single file succession along a predetermined path, said path including an inspection position;

a first rotary inspection head axially aligned with a closure in an inspection position;

drive means for said inspection head;

a light source disposed in said head for directing a beam of light toward the periphery of a closure in said inspection position;

a first sensing means responsive to light from said source and disposed in said head to receive light from said source reflected by the periphery of the closure for outputting a first defect signal;

a second rotary inspection head axially aligned with a closure in an inspection position;

drive means for said second head;

electromagnetic transducer means disposed in said second head for applying an electromagnetic field to a portion of the inner, radial flange of a closure and for sensing a manifestation of field continuity in said flange;

second sensing means associated with said electromagnetic transducing means and responsive to sensed fluctuations in field continuity for outputting a second defect signal;

gating means responsive to the periodic advancement of closures for producing a discharge enabling signal so that spurious defect signals are not produced by the sucession of one closure by the next;

delay means for receiving said defect signals, said delay means being coupled to said gating means and to said sensing means for producing a reject signal a controllable time subsequent to the production of a defect signal; and ejection means coupled to said delay means and responsive to said reject signal to eject a closure bearing a previously-sensed defect from said conveying means.

2. Apparatus according to claim 1, wherein said light source comprises means for producing infrared light, and said first sensing means is responsive to the incidence of infrared light.

3. Apparatus according to claim 1, including means for collimating light from said source, and said source collimating means and first sensing means are angularly disposed with respect to one another to allow the collimated light to be reflected directly toward said first sensing means.

4. Apparatus according to claim 3, wherein said collimating means includes an opaque mask coupled to said first inspection head.

5. Apparatus according to claim 4, wherein said mask is provided with an opening therein which registers with at least said light source and subtends an angle of substantially 15° measured from the center of rotation of said first inspection head.

6. Apparatus according to claim 1, wherein said first and said second rotary inspection heads are substantially coaxial.

7. Apparatus according to claim 1, wherein said delay means comprises a shift register for allowing a reject signal to be passed after a predetermined number of events occur subsequent to the reception of a defect signal.

8. Apparatus according to claim 7, wherein said apparatus comprises a member which rotates periodically and in synchronism with the periodic advancement of the closures, and said delay means includes a sensor responsive to the rotation of said member for producing pulses to be shifted by said shift register.

9. Apparatus according to claim 1, wherein said conveying means comprises a substantially linear conveyor including spring-biased latches for urging successive closures toward said inspection position.

10. Apparatus for inspecting top closures for aerosol containers, said closures having an outer, peripheral depressed flange for receiving a quantity of sealing compound and an inner, curled flange, comprising:

a conveyor including means for urging closures successively along a predetermined path, said path including an inspection position;

first and second rotary inspection heads in substantially coaxial alignment and disposed above and below said inspection position, respectively;

drive means for said inspection heads;

a light source disposed in said first inspection head for directing a beam of light upon the periphery of a top member disposed in said inspection position;

a light sensor responsive to light from said source and disposed in said first inspection head;

electromagnetic transducer means disposed in said second inspection head for applying an electromagnetic field to a portion of the inner flange curl of a closure disposed at said inspection position and for sensing a manifestation of field discontinuity produced by a split in said curl;

sensing means coupled to said light sensor and to said electromagnetic transducer means for outputting a defect signal in response to the sensing of a discontinuity in sealing compound in said depressed flange or in the metal of said flange curl;

delay means comprising means for outputting a reject signal in response to the production of a defect signal and substantially simultaneously with the arrival of a defective closure at an ejection station; and ejection means coupled to said delay means and responsive to said reject signal to eject a defective closure from said conveying means.

11. A method of inspecting top closures for aerosol containers having an outer, peripheral depressed flange for receiving a quantity of sealing compound and an inner, curled flange, comprising the steps of:

sequentially conveying ones of said closures along a path including an inspection station;

disposing a source of light above said inspection station;

rotating said source of light substantially concentrically with a closure at said station;

sensing light reflected from the depressed flange of said closure;

producing a signal representative of a discontinuity in reflectance of said flange area, said discontinuity representing a gap in sealing compound thereon;

producing an eject signal in response to said defect signal;

delaying the production of said eject signal until a sensed defective closure has traversed said path to an ejection station; and ejecting the sensed defective closure.

12. A method according to claim 11, further including the step of disposing an electromagnetic sensor beneath the inspection station and in close conjunction with the flange curl of a closure disposed at said station;

inducing an electromagnetic field in a localized region of said curl;

sensing a manifestation of said field;

rotating said electromagnetic transducer about in a circle to traverse the entire periphery of the curl;

producing a second defect signal in response to a sensed discontinuity in said manifestation, indicating a split in said curl; and applying said defect signal to said delay means.

13. The method according to claim 12, wherein the circular paths traced by said light source and said electromagnetic transducer means are substantially coaxial.

14. A method according to claim 13, further including the steps of:

providing cyclically-moving means operating in synchronism with the advancement of the closures;

sensing the periodic movement of said means;

counting the cyclic movements and delaying the production of said eject signal until a predetermined number of said movements have occurred.

* * * * *